(12) United States Patent  
Du et al.

(10) Patent No.: US 11,030,420 B2  
(45) Date of Patent: *Jun. 8, 2021

(54) TRANSLATING LANGUAGE CHARACTERS IN MEDIA CONTENT

(71) Applicant: Microsoft Technology Licensing, LLC, Redmond, WA (US)

(72) Inventors: Jun Du, Beijing (CN); Lei Sun, Beijing (CN); Jian Sun, Beijing (CN); Qiang Huo, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,256

(22) Filed: Feb. 25, 2019

(65) Prior Publication Data

US 2019/0294686 A1 Sep. 26, 2019

Related U.S. Application Data

(63) Continuation of application No. 15/010,238, filed on Jan. 29, 2016, now Pat. No. 10,216,730, which is a (Continued)

(51) Int. Cl.
*G06F 40/58* (2020.01)
*G06F 3/048* (2013.01)
(Continued)

(52) U.S. Cl.
CPC ............ *G06F 40/58* (2020.01); *G06F 3/0488* (2013.01); *G06F 3/04842* (2013.01); *G06F 16/5846* (2019.01)

(58) Field of Classification Search
CPC ... G06F 17/289; G06F 3/04883; G06K 9/325; G06K 9/3258; G06K 9/2081
See application file for complete search history.

(56) References Cited

U.S. PATENT DOCUMENTS 8,520,983 B2* 8/2013 Lee ...................... G06K 9/2081  
 382/293  
8,831,381 B2* 9/2014 Baheti ................ G06K 9/00456  
 382/289

(Continued)

OTHER PUBLICATIONS

Nakajima, Hideharu, et al. "Portable translator capable of recognizing characters on signboard and menu captured by built-in camera." Proceedings of the ACL 2005 on Interactive poster and demonstration sessions. Association for Computational Linguistics, 2005. (Year: 2005).*

(Continued)

*Primary Examiner* — Jialong He

(57) ABSTRACT

Some implementations disclosed herein provide techniques and arrangements to enable translating language characters in media content. For example, some implementations receive a user selection of a first portion of media content. Some implementations disclosed herein may, based on the first portion, identify a second portion of the media content. The second portion of the media content may include one or more first characters of a first language. Some implementations disclosed herein may create an image that includes the second portion of the media content and may send the image to a server. Some implementations disclosed herein may receive one or more second characters of a second language corresponding to a translation of the one or more first characters of the first language from the server.

20 Claims, 11 Drawing Sheets

Related U.S. Application Data continuation of application No. 13/277,109, filed on Oct. 19, 2011, now Pat. No. 9,251,144.

(51) Int. Cl.
*G06F 3/0484* (2013.01)
*G06F 3/0488* (2013.01)
*G06F 16/583* (2019.01)

(56) References Cited

U.S. PATENT DOCUMENTS

| | | | | |
|---|---|---|---|---|
| 2001/0056342 A1* | 12/2001 | Piehn | ............... | G06F 17/289 704/3 |
| 2003/0120478 A1* | 6/2003 | Palmquist | ........... | G06F 17/2863 704/3 |
| 2003/0149557 A1* | 8/2003 | Cox | ............... | H04M 3/42229 704/2 |
| 2008/0221862 A1* | 9/2008 | Guo | ............... | G06F 17/289 704/2 |
| 2008/0233980 A1* | 9/2008 | Englund | ............... | G06F 17/289 455/466 |
| 2008/0273796 A1* | 11/2008 | Kansal | ............... | G06K 9/325 382/176 |
| 2009/0052802 A1* | 2/2009 | Curtis | ............... | G06T 3/608 382/289 |
| 2010/0026721 A1* | 2/2010 | Park | ............... | G06F 3/0481 345/660 |
| 2010/0289757 A1* | 11/2010 | Budelli | ............... | G06F 3/04842 345/173 |
| 2011/0081083 A1* | 4/2011 | Lee | ............... | G06K 9/2081 382/182 |
| 2011/0116107 A1* | 5/2011 | Rueby | ............... | G06T 3/4007 358/1.2 |
| 2011/0137926 A1* | 6/2011 | Chen | ............... | G06F 16/951 707/760 |
| 2012/0249595 A1* | 10/2012 | Feinstein | ............... | G06F 1/1694 345/642 |
| 2012/0306772 A1* | 12/2012 | Tan | ............... | G06F 3/04842 345/173 |
| 2013/0046544 A1* | 2/2013 | Kay | ............... | G06F 3/04886 704/275 |
| 2013/0103383 A1* | 4/2013 | Du | ............... | G06F 3/0488 704/3 |
| 2014/0111542 A1* | 4/2014 | Wan | ............... | G06F 3/147 345/633 |
| 2014/0172408 A1* | 6/2014 | Vukosavljevic | ...... | G06F 17/211 704/2 |

OTHER PUBLICATIONS

Watanabe, Yasuhiko, et al. "Translation camera on mobile phone." 2003 International Conference on Multimedia and Expo. ICME'03. Proceedings (Cat. No. 03TH8698). vol. 2. IEEE, 2003. (Year: 2003).*

* cited by examiner

TRANSLATING LANGUAGE CHARACTERS IN MEDIA CONTENT

CROSS-REFERENCE TO RELATED APPLICATION(S)

This application is a continuation of U.S. application Ser. No. 15/010,238, filed on Jan. 29, 2016, and entitled "Translating Language Characters in Media Content," now U.S. Pat. No. 10,216,730, which is a continuation of U.S. application Ser. No. 13/227,109, filed on Oct. 19, 2011, and entitled "Translating Language Characters in Media Content," now U.S. Pat. No. 9,251,144, the contents of each of which are incorporated herein in their entirety.

BACKGROUND

When learning a new language or when visiting a foreign country, people may desire to translate to/from one language to another language. For example, people may carry a dictionary or phrase book that translates between two or more languages to enable them to communicate in a language that is not their native language ("mother tongue"). Self-contained electronic translators may also enable people to enter characters, words, and phrases for translation. However, books and electronic translators have several limitations. For example, the books and electronic translators are not universal but instead specialize in specific languages. Thus, a user travelling to several different countries may have to carry several different books or electronic translators.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques and arrangements to enable translating language characters in media content. For example, some implementations receive a user selection of a first portion of media content. Some implementations disclosed herein may, based on the first portion, identify a second portion of the media content. The second portion of the media content may include one or more first characters of a first language. Some implementations disclosed herein may create an image that includes the second portion of the media content and may send the image to a server. Some implementations disclosed herein may receive one or more second characters of a second language corresponding to a translation of the one or more first characters of the first language from the server.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Translating Language Characters in Media Content

Figure 1:
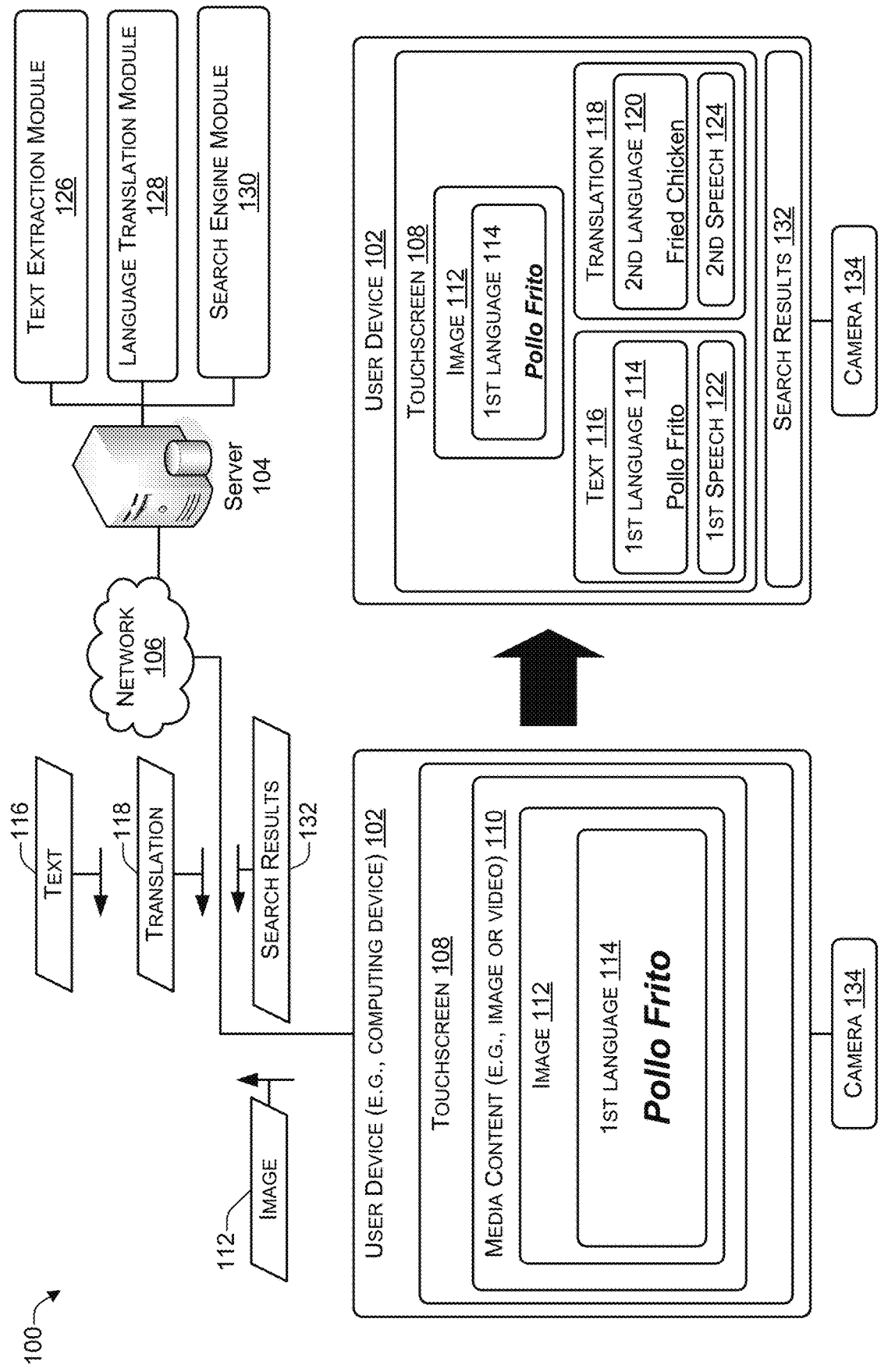
FIG. 1 illustrates an example framework for translating language characters in media content according to some implementations.

The technologies described herein generally relate to translating language characters in media content. A user may view media content, such as an image or a video, via a user device, such as a computing device. The media content may include characters of a first language. The computing device may be a wireless phone, a tablet computing device, a netbook computing device, a laptop computing device, another type of computing device, or any combination thereof.

The user may select a first portion of the media content that includes at least a portion of the characters of the first language. When the media content is an image, the first portion may be selected using a gesture on a touchscreen of the user device. For example, the gesture may be a tap on the touchscreen, a swipe on the touchscreen, or an approximately circular gesture on the touchscreen. When the media content is a video, the user may position an overlay (e.g., a cross mark, a bounding box, a geometric shape, or other graphic) over the characters of the first language to select the first portion of the media content.

The characters of the first language in the media content may be displayed at any angle between 0 and 360 degrees relative to the touchscreen. For example, the characters of the first language in the media content may be rotated at an angle relative to a bottom of the touchscreen.

Based on the first portion of the media content selected by the user, the user device may identify a second portion of the media content. For example, the first portion may include one or more characters of a word and the second portion may include the entire word. As another example, the first portion may include a character from a first word of a phrase and a character from a second word of the phrase and the second portion may include the entire phrase. The second portion may be referred to as the intended text. As yet another example, the first portion may include one or more characters of a sentence, a phrase, multiple sentences, or a paragraph and the second portion may include the entire sentence, the entire phrase, the multiple sentences, or the paragraph, respectively. Thus, the second portion may include text that the user intends to select, referred to herein as intended text.

The user device may create an image from the media content that includes the second portion. The user device may process the image to reduce a size of the image. The user device may send the image to a remote server via a network. The remote server may extract text including the characters of the first language. The remote server may translate the characters of the first language in the image to a second language. For example, a word, a phrase (e.g., two or more words), a sentence, multiple sentences, or a paragraph may be translated from the first language to the second language to create a translation. The user device may receive the translation from the server and display the translation.

In response to a user selection, the characters in the first language or the characters in the second language may be audibly output. For example, in some implementations, a text-to-speech synthesizer may be provided by the user device to audibly output the characters displayed on the touchscreen of the user device. In other implementations, the server may perform text-to-speech conversion and send an audio file to the user device for play back. The server may create a first audio file corresponding to the text extracted from the image, a second audio file corresponding to the translation, or both. For example, the user device may request the audio file when the user device lacks text-to-speech capabilities. The audio file may be in a compressed format, such as windows media audio (WMA) format or motion picture experts group (MPEG) layer three (mp3) format, or an uncompressed format such as .wav format.

The server may perform one or more searches and return the search results to the user device for display. For example, the server may perform a visual search based on the image, a text-based search based on the characters in the first language, a text-based search based on the characters in the second language, another type of search based on the image, or any combination thereof. In some implementations, the user device may display the search results in response to a user selection.

Framework for Translating Language Characters in Media Content

FIG. 1 illustrates an example of a framework 100 for translating language characters in media content according to some implementations. The framework 100 may be executed by a computing device or other particular machine specifically configured with processor-executable instructions, as discussed additionally below. The framework 100 includes a user device 102 coupled to a server 104 via a network 106.

The user device 102 may be a wired or wireless computing device, such as a desktop computer, a laptop computer, a netbook computer, a tablet computer, a personal digital assistant (PDA), a camera, a portable music playback device, a wireless phone, another type of computing device, or any combination thereof. The user device 102 may include a touchscreen 108. The touchscreen 108 may be used to display content and to receive user input. For example, the touchscreen 108 may display a user interface to enable a user to interact with the user device 102. The user device 102 may include other input devices, such as a camera 134, a microphone, a keyboard, buttons, potentiometers, and the like. The camera 134 may be integrated with the user device 102 or may be external and coupled to the user device 102. The user device 102 may include other output devices, such as a speaker to provide audio output.

The network 106 may be implemented as a wired network, a wireless network, a public network, a private network, another type of network, or any combination thereof. For example, the network 106 may include wireless technologies such as code division multiple access (CDMA), global system for mobile (GSM), WiFi® (IEEE 802.11), WiMax®, and the like.

The server 104 may include one or more hardware servers or virtual servers (e.g., in a cloud computing environment, etc.). The server 104 may provide various types of services, such as cloud-based computing services. In some implementations, the services provided by the server 104 may be billable services. For example, when the user device 102 is a mobile phone, the server 104 may provide services based on a subscription or may bill a user on a per transaction basis.

In operation, the user device 102 may use the touchscreen 108 to display media content 110, such as a picture (e.g., a still image) or a video. For example, the user may use a camera associated with the user device to capture the media content 110. The user may store the captured media content 110 in a memory of the user device 102. The user may use the touchscreen 108 to retrieve and display the media content 110 on the touchscreen 108.

The user may input a gesture, such as a tap, a swipe, a circular gesture, or other types of gesture to select at least a portion of characters of a first language 114 that are displayed in the media content 110. The user may input the gesture via a user appendage, such as a finger, or via an input instrument, such as a stylus. In response to receiving the gesture input, the user device 102 may create an image 112 that includes characters in the first language 114 based on the media content 110 and the gesture input. As used herein, the term characters may include symbols, numbers, pictograms, sonograms, graphics, and graphemes. The image 112 may be smaller in size than the media content 110. In some implementations, user device 102 may perform processing to reduce the size of the image 112, such as by converting the media content 110 from a color image to a grayscale image, reducing a size of the media content 110, as described in more detail below. The user device 102 may send the image 112 to the server 104.

The server 104 may receive the image 112 and perform various services based on the image 112. For example, the server 104 may provide a text extraction module 126 that performs optical character recognition (OCR) on the characters of the first language 114 in the image 112 to extract text 116. The server 104 may generate a translation 118 of the extracted text 116 using a language translation module 128. The translation 118 may include one or more characters of a second language 120. The language translation module 128 may use one or more of a dictionary-based translation, a phrase-based translation, another type of translation, or any combination thereof. For example, when the extracted text 116 comprises a word, the language translation module 128 may use an electronic dictionary to determine the translation 118. When the extracted text 116 comprises a phrase, the language translation module 128 may use an electronic phrase database to determine the translation 118.

The server 104 may perform a search using a search engine module 130 based on one or more of the image 112, the translation 118, and the extracted text 116. The server 104 may send one or more of the translation 118 and search results 132 to the user device 102. In some implementations, one or more of the text extraction module 126, the language translation module 128, and the search engine module 130 may operate in parallel (e.g., substantially simultaneously or contemporaneously). For example, the search engine module 130 may perform an image-based search using the image 112 while the text extraction module 126 extracts the text 116. The search engine module 130 may perform a text-based search using the text 116 while the language translation module 128 creates the translation 118 from the text 116.

After receiving the translation 118, the user device 102 may display, on the touchscreen 108, one or more of the image 112, the text 116, and the translation 118. A user interface of the user device 102 may enable selection of a first speech 122 function that provides audio output corresponding to the text 116. The user interface of the user device 102 may enable selection of a second speech 124 function that provides audio output corresponding to the translation 118. In some implementations, in response to the user selecting the first speech 122 function or the second speech 124 function, a text-to-speech module of the user device 102 may provide audio output corresponding to the text 116 or the translation 118, respectively.

In other implementations, the server 104 may send a first audio file corresponding to the text 116 when the server 104 sends the text 116 to the user device 102 and the server 104 may send a second audio file corresponding to the translation 118 when the server 104 sends the translation 118 to the user device 102. In these implementations, in response to the user selecting the first speech 122 function or the second speech 124 function, the user device 102 may play back an audio file corresponding to the text 116 or the translation 118, respectively.

In some implementations, the user device 102 may receive the search results 132 from the server 104 and automatically display the search results 132 on the touchscreen 108. In other implementations, the user device 102 may receive the search results 132 from the server 104 and, in response to a user selection, display the search results 132 on the touchscreen 108.

Thus, the user device 102 may enable a user to select a portion of the media content 110 using a gesture, such as a tap, a swipe, or a circular gesture. In response, the user device 102 may create an image 112 from the media content 110 that includes characters of a first language. The image 112 may be sent from the user device 102 to the server 104. The server 104 may extract the text 116 from the image 112, determine the translation 118 of the text 116, and send the text 116 and the translation 118 to the user device 102 for display on the touchscreen 108. The server 104 may perform a search based on one or more of the image 112, the text 116, and the translation 118. After performing the search, the server 104 may send the search results 132 to the user device 102. The entire process, from the time the gesture input is received from the user to the time the text 116 and the translation 118 are displayed may take less than three seconds. If the network 106 is capable of relatively fast throughput, the text 116 and the translation 118 may be displayed on the touchscreen 108 less than one second after receiving the gesture input.

The framework 100 may provide several advantages, such as more accurate text extraction by identifying user-intended text, lower bandwidth usage of the network 106 by sending the image 112 that is smaller than the media content 110 to the server 104, lower latency from when the gesture input is received to when the translation 118 is displayed because the image 112 is smaller than the media content 110, and longer battery life by having the user device 102 perform fewer computations by using the services provided by the server 104.

The media content 110, in the form of an image or a video, may be stored in a memory of the user device 102. For example, a camera that is integrated into or coupled to the user device 102 may be used to capture the media content 110. To identify the characters of the first language 114, the user may select an image mode or a video mode, based on whether the media content 110 is an image or a video. In the image mode, the user may use one of three finger gestures, a tap gesture, a swipe gesture, or an approximately circular gesture, to indicate the intended text, as described in the description of FIGS. 2, 3, and 4.

User Selection of Intended Text Via a Tap Gesture

Figure 2:
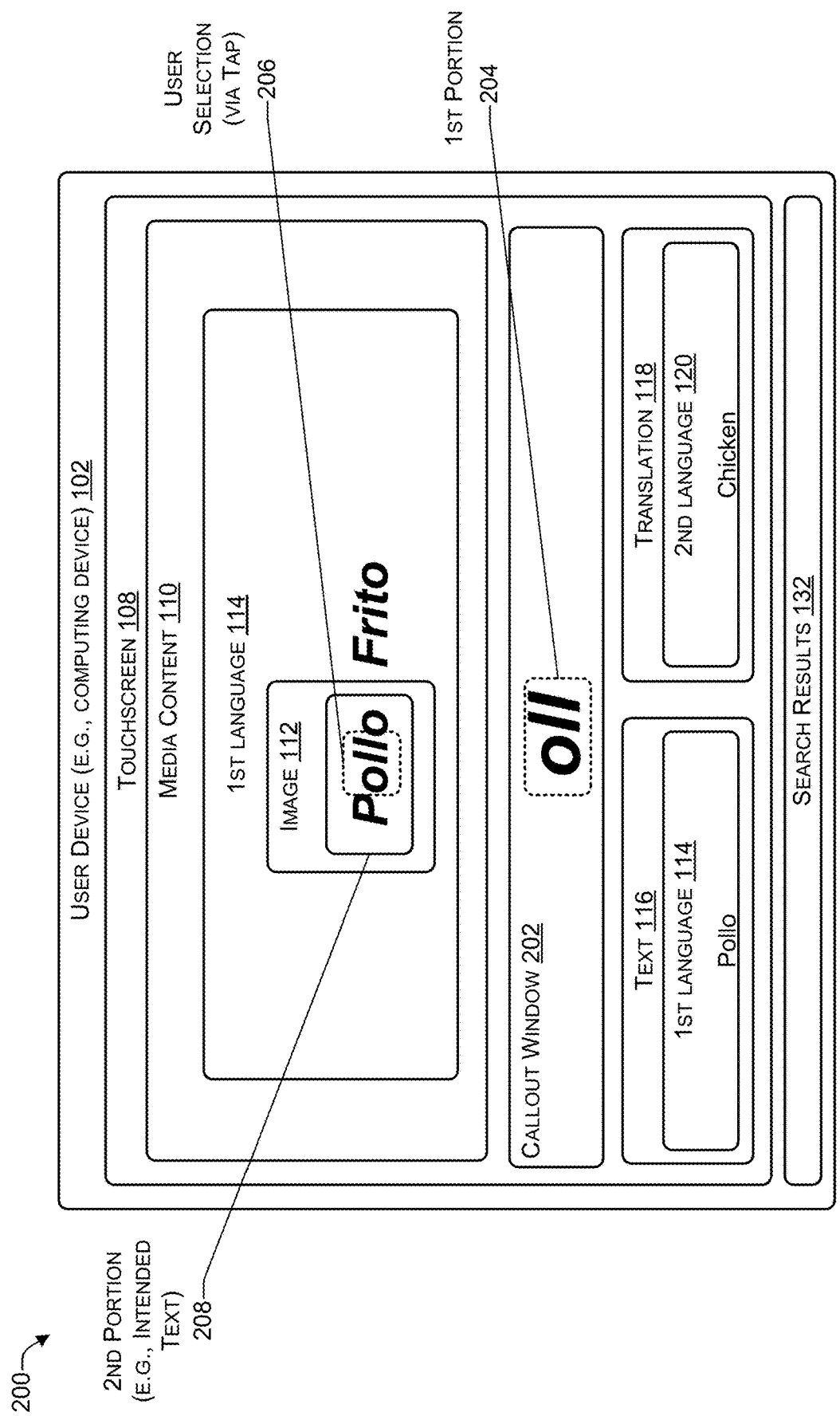
FIG. 2 illustrates an example framework for selecting language characters in media content for translation via a tap gesture according to some implementations.

FIG. 2 illustrates an example framework 200 for selecting language characters in media content for translation via a tap gesture according to some implementations. The tap gesture may be used to select a word or words in a Latin-based language such as English or to select a character or characters in a pictorial-character-based language such as Chinese or Japanese. The media content 110 may include one or more of an image and a video.

The user may use a tap gesture anywhere inside the characters of the first language 114. In response to the tap, the user device 102 may display a callout window 202 that provides more information about a user selection 206. For example, the callout window 202 may magnify or otherwise enhance the user selection 206 of a first portion 204 of the media content 110. The callout window 202 may include a copy of the user selection 206 occluded by a finger (or a stylus) without occluding the intended characters of the first language 114. The user may make corrective movements while keeping the finger (or the stylus) on the touchscreen 108 until the callout window 202 displays at least a portion of the intended text and then lift the finger (or stylus) to select the first portion 204 of the media content 110.

In the example illustrated in FIG. 2, the user has selected the first portion 204 of the media content 110 via a tap gesture. The first portion 204 includes the characters "oll" from the Spanish word "Pollo." The user device 102 may use text detection to detect a second portion 208 of the media content 110 that includes the entire word "Pollo."

The user device 102 may create the image 112 that includes the second portion 208 and send the image 112 to the server 104. The user device 102 may receive, from the server 104, the text 116 that includes characters of the first language 114. The user device 102 may receive, from the server 104, the translation 118 that includes characters of the second language 120. As illustrated in FIG. 2, the user device 102 may display the text 116 that includes the characters "Pollo" in the first language 114 (e.g., Spanish) and may display the translation 118 that includes the characters "Chicken" in the second language 120 (e.g., English). The user device 102 may also display the search results 132 that results from an Internet search of one or more of the words "Pollo" and "Chicken."

Thus, a user can provide the user selection 206 of the first portion 204 of the media content 110 via a tap gesture on the touchscreen 108. The first portion 204 may include one or more characters of a first language 114. The user device 102 may identify the second portion 208 based on the first portion 204. The second portion 208 may include a larger portion of the media content 110 than the first portion 204. For example, the first portion 204 may include one or more characters of a word while the second portion 208 may include the entire word. The user device 102 may create the image 112 that includes the second portion 208 and send the image 112 to the server 104. In response, the server 104 may extract the text 116 from the image 112 and determine the translation 118 of the text 116. The server 104 may send the text 116 and the translation 118 to the user device 102 for display on the touchscreen 108. The server 104 may perform a search based on one or more of the image 112, the text 116, and the translation 118 and send the search results 132 to the user device 102. The user device 102 may display on the touchscreen 108 one or more of the image 112, the text 116, the translation 118, and the search results 132.

User Selection of Intended Text Via a Swipe Gesture

Figure 3:
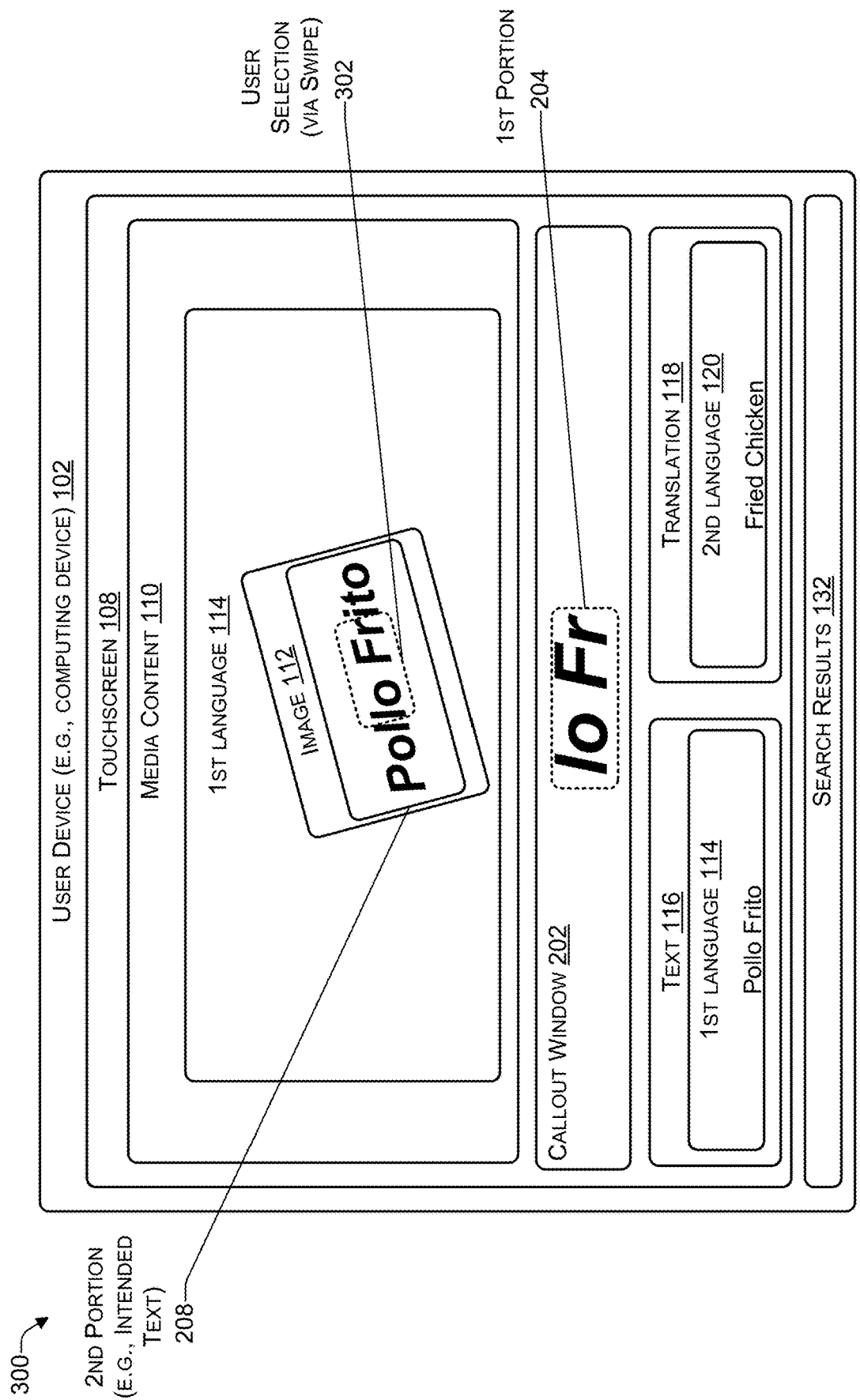
FIG. 3 illustrates an example framework for selecting language characters in media content for translation via a swipe gesture according to some implementations.

FIG. 3 illustrates an example framework 300 for selecting language characters in media content for translation via a swipe gesture according to some implementations. The swipe gesture may be used to select a word, a phrase, or a line of text in a language such as English or to select a one or more characters in a language such as Chinese or Japanese. The media content 110 may include one or more of an image and a video.

The swipe gesture may be input by enabling the user to make corrective movements (e.g., vertical, horizontal, or both) to select a starting point, enabling corrective movements to select an endpoint (e.g., vertical, horizontal, or both), and identifying a user selection 302 in response to the user lifting a finger (or a stylus). The user may use the swipe gesture anywhere inside the characters of the first language 114. The characters of the first language 114 may not be displayed horizontal relative to a bottom of the touchscreen 108. For example, the characters of the first language 114 may be at a particular angle (e.g., between 0 and 360 degrees) relative to the touchscreen 108. As illustrated in FIG. 3, the characters of the first language 114 may be rotated at an angle relative to the bottom of the touchscreen 108. The user selection 302 may be received via a swipe gesture that is approximately at the same angle as the characters of the first language 114 relative to the bottom of the touchscreen 108.

In response to the swipe gesture, the user device 102 may display the callout window 202 that provides more information about the user selection 302. For example, the callout window 202 may magnify or otherwise enhance the user selection 302 of the first portion 204 of the media content 110. The callout window 202 may include a copy of the user selection 302 occluded, at least temporarily, by a finger (or a stylus) without occluding the intended characters of the first language 114.

In the example illustrated in FIG. 3, the user has selected the first portion 204 of the media content 110 via a swipe gesture. The first portion 204 includes the characters "lo Fr", with the characters "lo" corresponding to the last few letters of the Spanish word "Pollo" and the characters "Fr" corresponding to the first few letters of the Spanish word "Frito." The user device 102 may use text detection to detect a second portion 208 of the media content 110 that includes the entire phrase (or sentence) "Pollo Frito."

The user device 102 may create the image 112 that includes the second portion 208 and send the image 112 to the server 104. The user device 102 may receive, from the server 104, the text 116 that includes the characters of the first language 114. The user device 102 may receive, from the server 104, the translation 118 that includes the characters of the second language 120. As illustrated in FIG. 3, the user device 102 may display the text 116 that includes the characters "Pollo Frito" in the first language 114 (e.g., Spanish) and may display the translation 118 that includes the characters "Fried Chicken" in the second language 120 (e.g., English). The user device 102 may also display the search results 132 that results from an Internet search of one or more of the words "Pollo", "Frito", "Fried", and "Chicken."

A word for word translation of "Pollo Frito" may result in "Chicken Fried" because "Pollo" translates to "Chicken" and "Frito" translates to "Fried." However, in this example, the entire phrase "Pollo Frito" has been translated from Spanish into the corresponding English phrase "Fried Chicken" rather than merely translating each individual word. This example is provided to illustrate that the server 104 may perform (i) a word-for-word translation of a phrase (or a sentence) using a dictionary lookup, (ii) a phrase translation using a phrase database lookup, or both. In some implementations, the server 104 may send the word-for-word translation, the phrase translation, or both to the user device 102. For example, which translation is sent to the user device 102 may be determined based on a user preference file stored in a memory of the user device 102. In some implementations, the server 104 may determine whether the word-for-word translation is more accurate or the phrase translation is more accurate and return the translation that the server 104 determines is the more accurate translation.

Thus, a user can provide the user selection 302 of the first portion 204 of the media content 110 via a swipe gesture on the touchscreen 108. The first portion 204 may include two or more characters of a first language 114. The user device 102 may identify the second portion 208 based on the first portion 204. The second portion 208 may include a larger portion of the media content 110 than the first portion 204. For example, the first portion 204 may include one or more characters of a phrase or a sentence while the second portion 208 may include the entire phrase or sentence. The user device 102 may create the image 112 that includes the second portion 208 and send the image 112 to the server 104. In response, the server 104 may extract the text 116 of the phrase or sentence from the image 112 and determine the translation 118 of the text 116. The server 104 may send the text 116 and the translation 118 to the user device 102 for display on the touchscreen 108. The server 104 may perform a search based on one or more of the image 112, the text 116, and the translation 118 and send the search results 132 to the user device 102. The user device 102 may display on the touchscreen 108 one or more of the image 112, the text 116, the translation 118, and the search results 132.

User Selection of Intended Text Via a Circular Gesture

Figure 4:
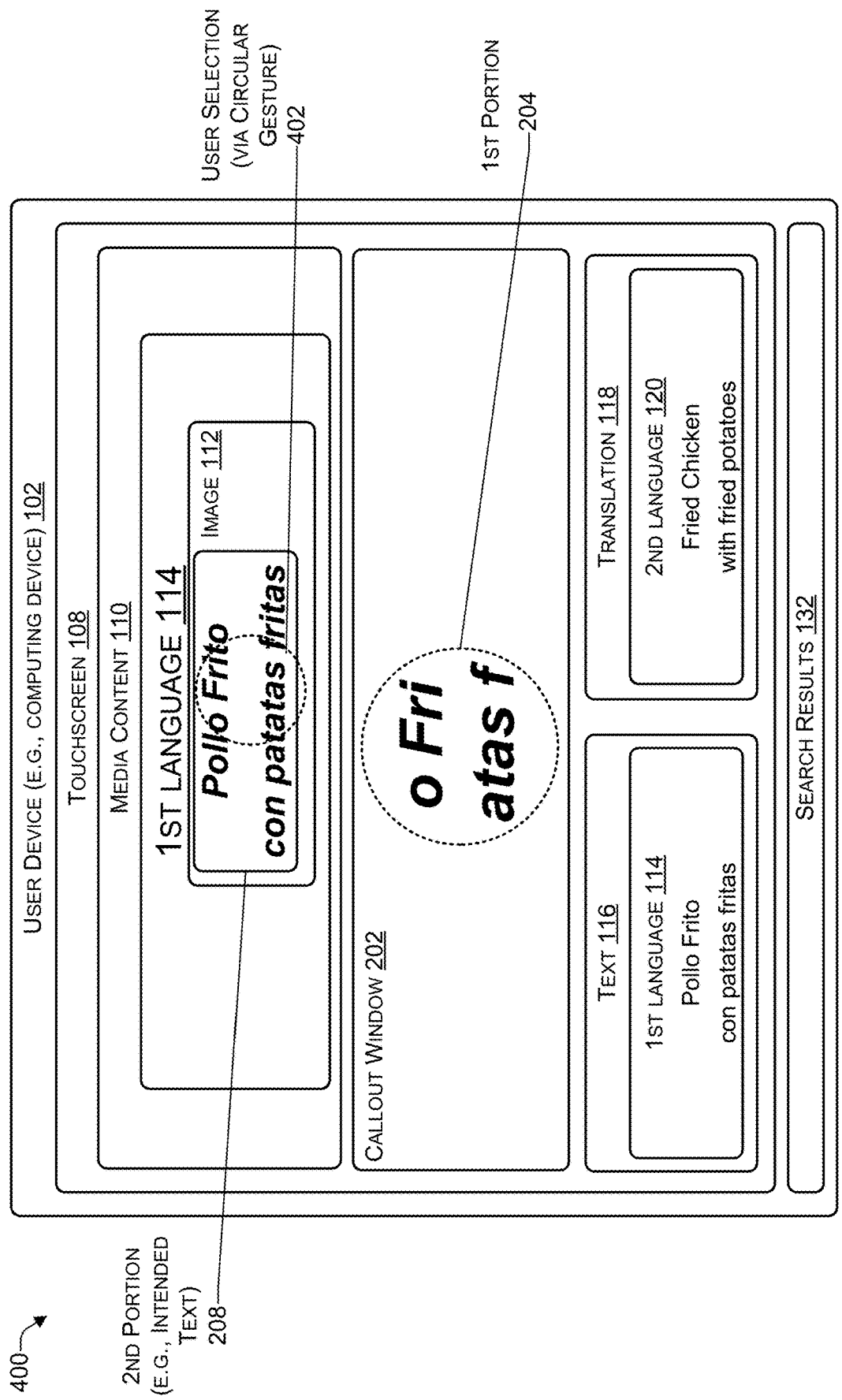
FIG. 4 illustrates an example framework for selecting language characters in media content for translation via a circle gesture according to some implementations.

FIG. 4 illustrates an example framework 400 for selecting language characters in media content for translation via a circular gesture according to some implementations. As discussed herein, the circular gesture may be a gesture that loosely approximates a circumference of a circle or ellipse. The circular gesture may be used to select a word, a phrase, a line of text, multiple lines of text, or a paragraph. The media content 110 may include one or more of an image and a video.

The circular gesture may be created by using a finger (or stylus) at a starting point and tracing an approximate circumference of a circle on the touchscreen 108 back to the starting point or near the starting point. The user may use the circular gesture anywhere inside the characters of the first language 114. In response to the circular gesture, the user device 102 may display the callout window 202 that provides more information about a user selection 402. For example, the callout window 202 may magnify or otherwise enhance the user selection 402 of the first portion 204 of the media content 110. The callout window 202 may include a copy of the user selection 402, e.g., an area approximately bounded by the circular gesture.

In the example illustrated in FIG. 4, the user has selected the first portion 204 of the media content 110 via a circular gesture. The first portion 204 includes the characters "o Fr" and "atas f", with the character "o" corresponding to the last letter of the word "Polio", the characters "Fr" corresponding to the first few letters of the word "Frito", the characters "atas" corresponding to the last few letters of the word "patatas", and the character "f" corresponding to the first letter of the word "fritas." The user device 102 may use text detection to detect a second portion 208 of the media content 110 that includes the entire phrase (or paragraph) "Polio Frito con patatas fritas."

The user device 102 may create the image 112 that includes the second portion 208 and send the image 112 to the server 104. The user device 102 may receive, from the server 104, the text 116 that includes the characters of the first language 114. The user device 102 may receive, from the server 104, the translation 118 that includes the characters of the second language 120. As illustrated in FIG. 4, the user device 102 may display the text 116 that includes the characters "Polio Frito con patatas fritas" in the first language 114 (e.g., Spanish) and may display the translation 118 that includes the characters "Fried Chicken with fried potatoes" in the second language 120 (e.g., English). The user device 102 may also display the search results 132 that results from an Internet search of one or more of the words "Polio", "Frito", "con", "patatas", "fritas", "Fried", "Chicken", "with", "fried", or "potatoes", or one or more phrases based on the one or more words.

In this example, the entire phrase "Polio Frito con patatas fritas" is translated from Spanish into the corresponding English phrase "Fried Chicken with fried potatoes" rather than merely translating each individual word. Thus, the server 104 may perform (i) a word-for-word translation of a sentence (or a paragraph) using a dictionary lookup, (ii) a sentence (or a paragraph) translation using a phrase database lookup, or both. In some implementations, the server 104 may send the word-for-word translation, the sentence (or paragraph) translation, or both to the user device 102. For example, which translation is sent to the user device 102 may be determined based on a user preference file stored in a memory of the user device 102. In some implementations, the server 104 may determine whether the word-for-word translation is more accurate or the sentence (or paragraph) translation is more accurate and return the translation that the server 104 determines is the more accurate translation.

Thus, a user can provide the user selection 402 of the first portion 204 of the media content 110 via an approximately circular gesture on the touchscreen 108. The first portion 204 may include two or more characters of a first language 114. The user device 102 may identify the second portion 208 based on the first portion 204. The second portion 208 may include a larger portion of the media content 110 than the first portion 204. For example, the first portion 204 may include one or more characters of a phrase, a sentence, or a paragraph while the second portion 208 may include the entire phrase, sentence or paragraph. The user device 102 may create the image 112 that includes the second portion 208 and send the image 112 to the server 104. In response, the server 104 may extract the text 116 of the phrase, sentence, or paragraph from the image 112 and determine the translation 118 of the text 116. The server 104 may send the text 116 and the translation 118 to the user device 102 for display on the touchscreen 108. The server 104 may perform a search based on one or more of the image 112, the text 116, and the translation 118 and send the search results 132 to the user device 102. The user device 102 may display on the touchscreen 108 one or more of the image 112, the text 116, the translation 118, and the search results 132.

User Selection of Intended Text Via a Cross Mark

Figure 5:
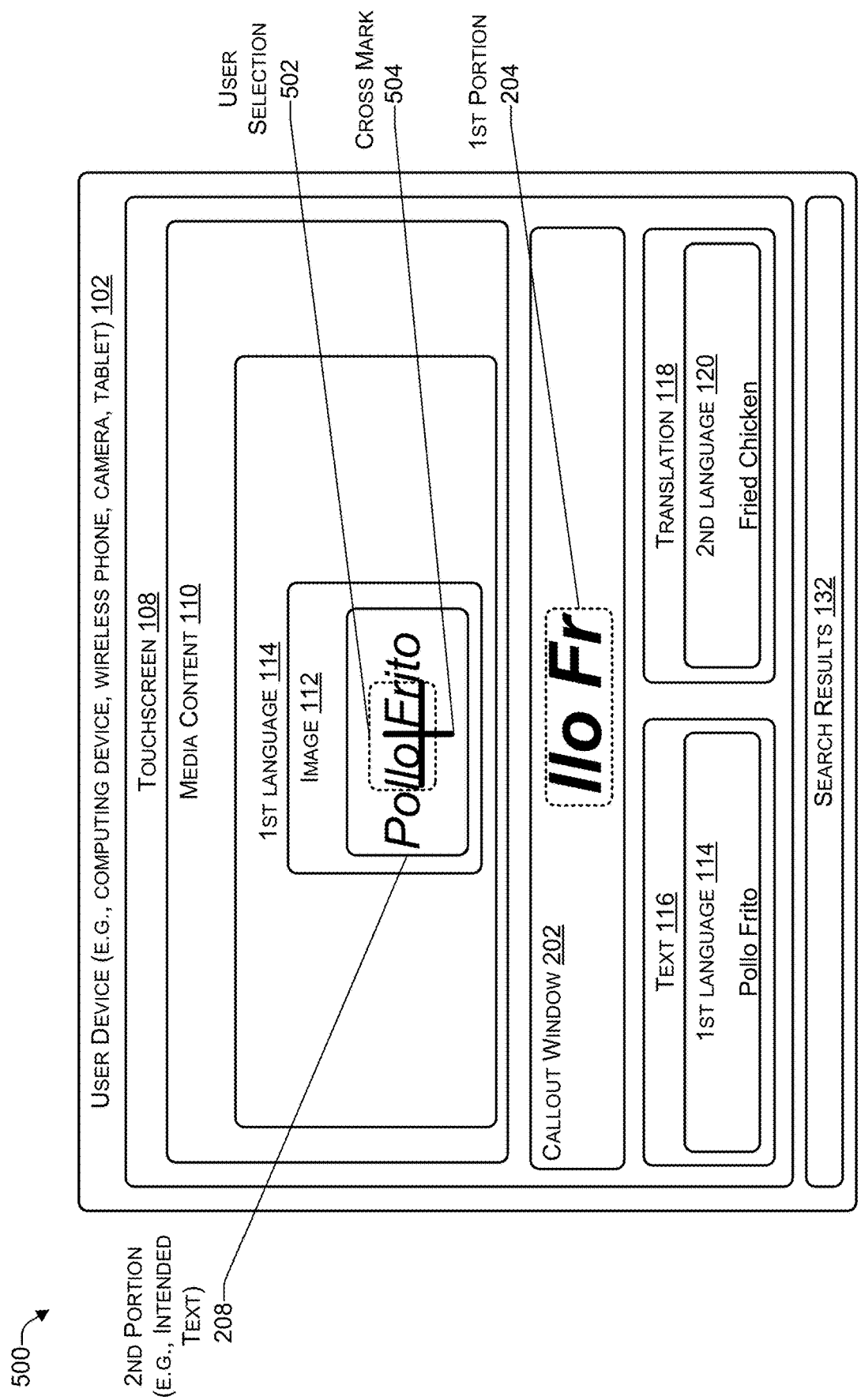
FIG. 5 illustrates an example framework for selecting language characters in media content for translation via a cross mark according to some implementations.

FIG. 5 illustrates an example framework 500 for selecting language characters in media content for translation via a cross mark 504 according to some implementations. The cross mark 504 may be used to select a word, a phrase, a line of text, a sentence, or a paragraph (e.g., multiple sentences) in a language such as English or to select one or more characters in a language such as Chinese or Japanese. The media content 110 may include one or more of an image and a video. In some implementations, the tap gesture, the swipe gesture, and the circular gesture may be used when the media content 110 includes an image while the cross mark 504 may be used when the media content 110 includes video content. In other implementations, one or more of the tap gesture, the swipe gesture, the circular gesture, and the cross mark 504 may be used to provide the user selection.

A cross mark 504 may be overlaid over a portion of the media content 110 to enable the user to provide a user selection 502. The user device 102 may display the callout window 202 that provides more information about the user selection 502. For example, the callout window 202 may magnify or otherwise enhance the user selection 502 of the first portion 204 of the media content 110. The callout window 202 may include a copy of the user selection 502. The user may input horizontal and vertical adjustments to position the cross mark 504 near or over one or more of the characters in the first language 114. For example, the horizontal and vertical adjustments may be made by swiping gestures via a finger (or a stylus) or by using arrow keys displayed on the touchscreen 108.

Once the cross mark 504 is positioned to the satisfaction of the user (e.g., the callout window 202 displays the word, phrase, sentence, or paragraph that the user desires to select), the user may create the user selection 502 by performing an action on a user interface of the user device 102. For example, once the cross mark 504 is satisfactorily positioned, the user may tap a location where the cross mark is displayed on the touch screen 108 to create the user selection 502. As another example, the user may select an appropriate key or user interface control to create the user selection 502. The user selection 502 may be based on which characters in the first language 114 are in close proximity to or overlaid by the cross mark 504.

In the example illustrated in FIG. 5, the first portion 204 includes the characters "llo Fr", with the characters "llo" corresponding to the last few letters of the Spanish word "Pollo" and the characters "Fr" corresponding to the first few letters of the Spanish word "Frito." The user device 102 may use text detection to detect a second portion 208 of the media content 110 that includes the entire phrase (or sentence) "Pollo Frito."

The user device 102 may create the image 112 that includes the second portion 208 and send the image 112 to the server 104. The user device 102 may receive, from the server 104, the text 116 that includes the characters of the first language 114. The user device 102 may receive, from the server 104, the translation 118 that includes the characters of the second language 120. As illustrated in FIG. 3, the user device 102 may display the text 116 that includes the characters "Pollo Frito" in the first language 114 (e.g., Spanish) and may display the translation 118 that includes the characters "Fried Chicken" in the second language 120 (e.g., English). The user device 102 may also display the search results 132 that results from an Internet search of one or more of the words "Pollo", "Frito", "Fried", and "Chicken."

The server 104 may perform (i) a word-for-word translation of a phrase (or a sentence) using a dictionary lookup, (ii) a phrase translation using a phrase database lookup, or both. In some implementations, the server 104 may send the word-for-word translation, the phrase translation, or both to the user device 102. For example, which translation is sent to the user device 102 may be determined based on a user preference file stored in a memory of the user device 102. In some implementations, the server 104 may determine whether the word-for-word translation is more accurate or the phrase translation is more accurate and return the translation that the server 104 determines is the more accurate translation.

In some implementations, the user may select a bounding box (e.g., a rectangular shaped box) or other geometric shape (e.g., a circle, a triangle, a square and the like) that is overlaid on the media content 110 instead of the cross mark 504. The width and height of the bounding box may be adjusted with corrective finger movements. The bounding box may be positioned similar to the cross mark 504 to provide the user selection 502.

Thus, a user may provide the user selection 502 of the first portion 204 of the media content 110 by positioning the cross mark 504 to overlay a portion of the media content 110 that is displayed on the touchscreen 108. The first portion 204 may include two or more characters of a first language 114. The user device 102 may identify the second portion 208 based on the first portion 204. The second portion 208 may include a larger portion of the media content 110 than the first portion 204. For example, the first portion 204 may include one or more characters of a phrase or a sentence while the second portion 208 may include the entire phrase or sentence. The user device 102 may create the image 112 that includes the second portion 208 and send the image 112 to the server 104. In response, the server 104 may extract the text 116 of the phrase or sentence from the image 112 and determine the translation 118 of the text 116. The server 104 may send the text 116 and the translation 118 to the user device 102 for display on the touchscreen 108. The server 104 may perform a search based on one or more of the image 112, the text 116, and the translation 118 and send the search results 132 to the user device 102. The user device 102 may display on the touchscreen 108 one or more of the image 112, the text 116, the translation 118, and the search results 132.

Example Processes

Figure 6:
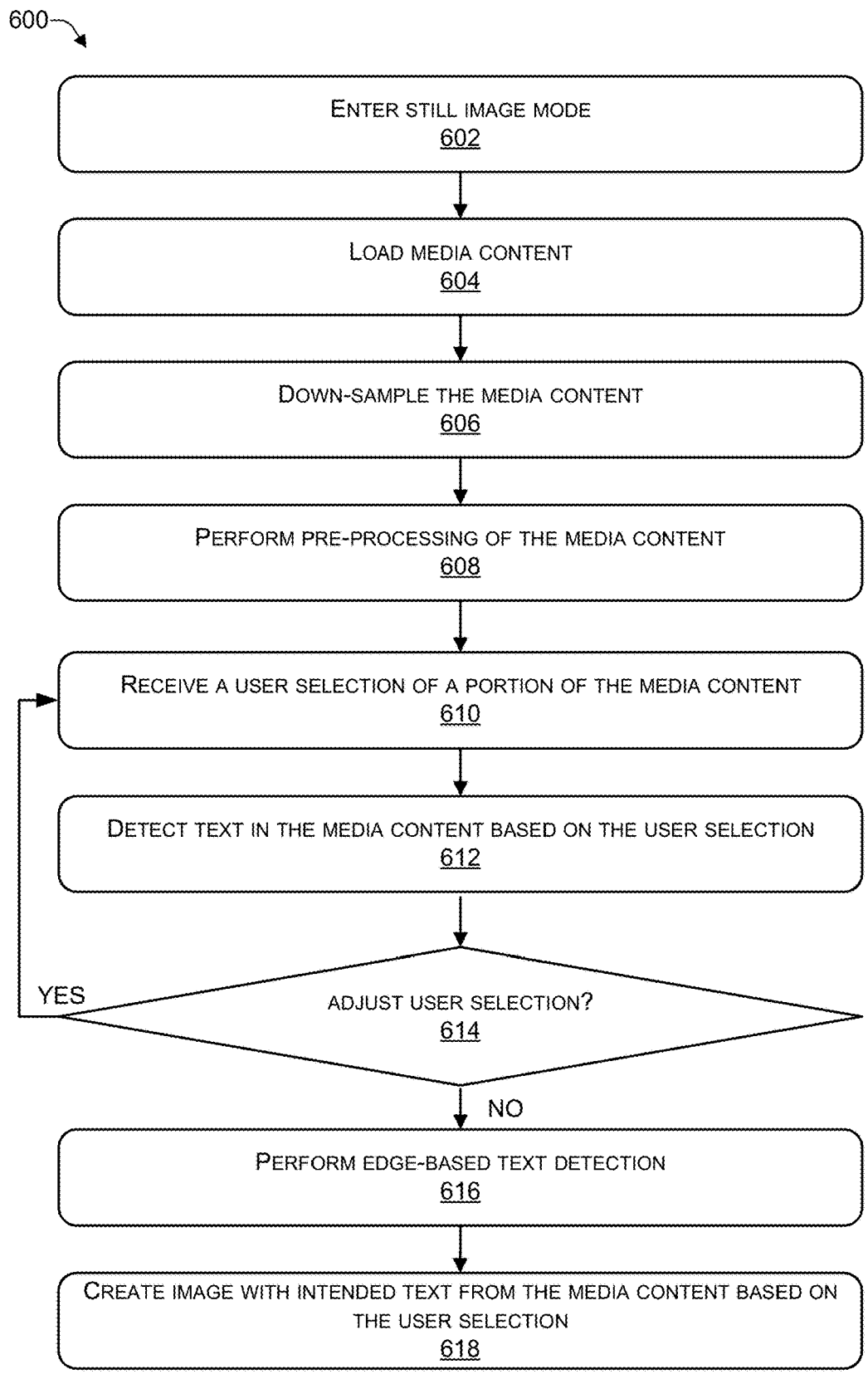
FIG. 6 is a flow diagram of an example process that includes creating an image with intended text according to some implementations.
Figure 7:
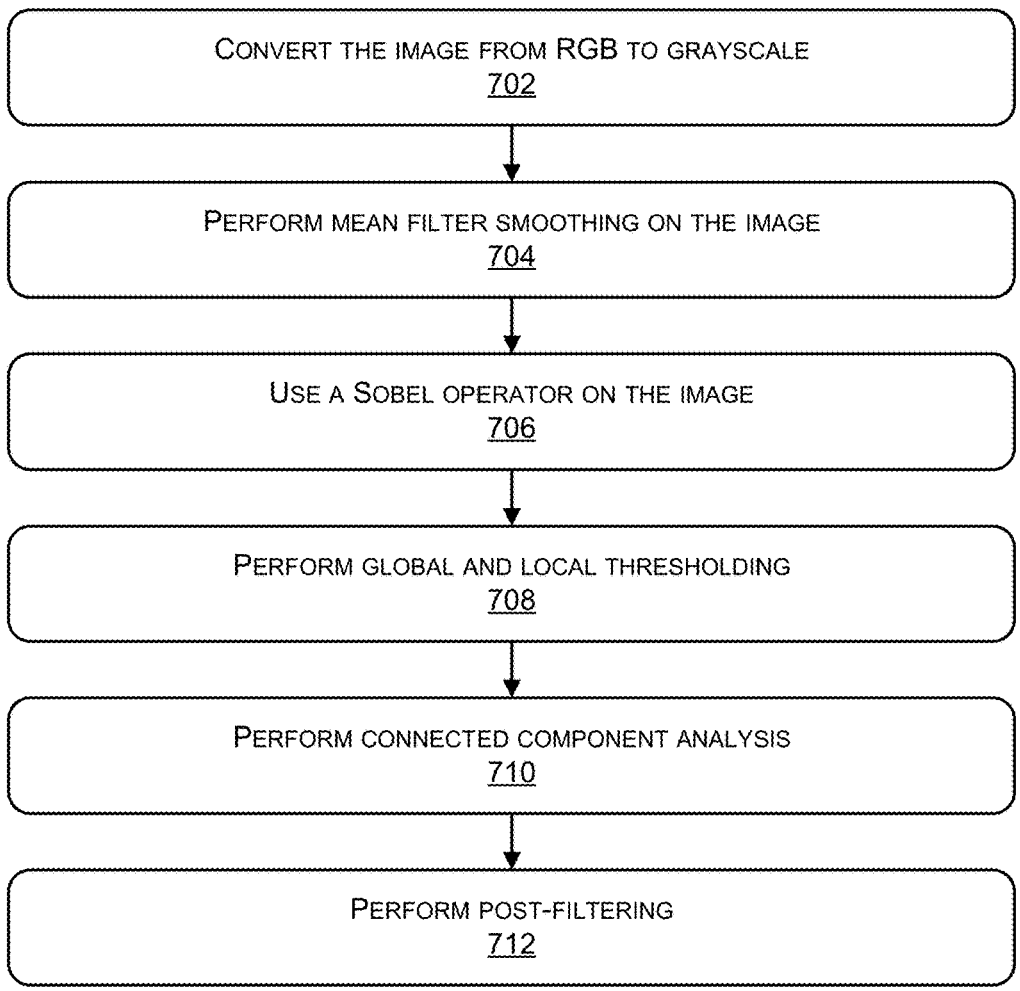
FIG. 7 is a flow diagram of an example process of pre-processing media content according to some implementations.
Figure 8:
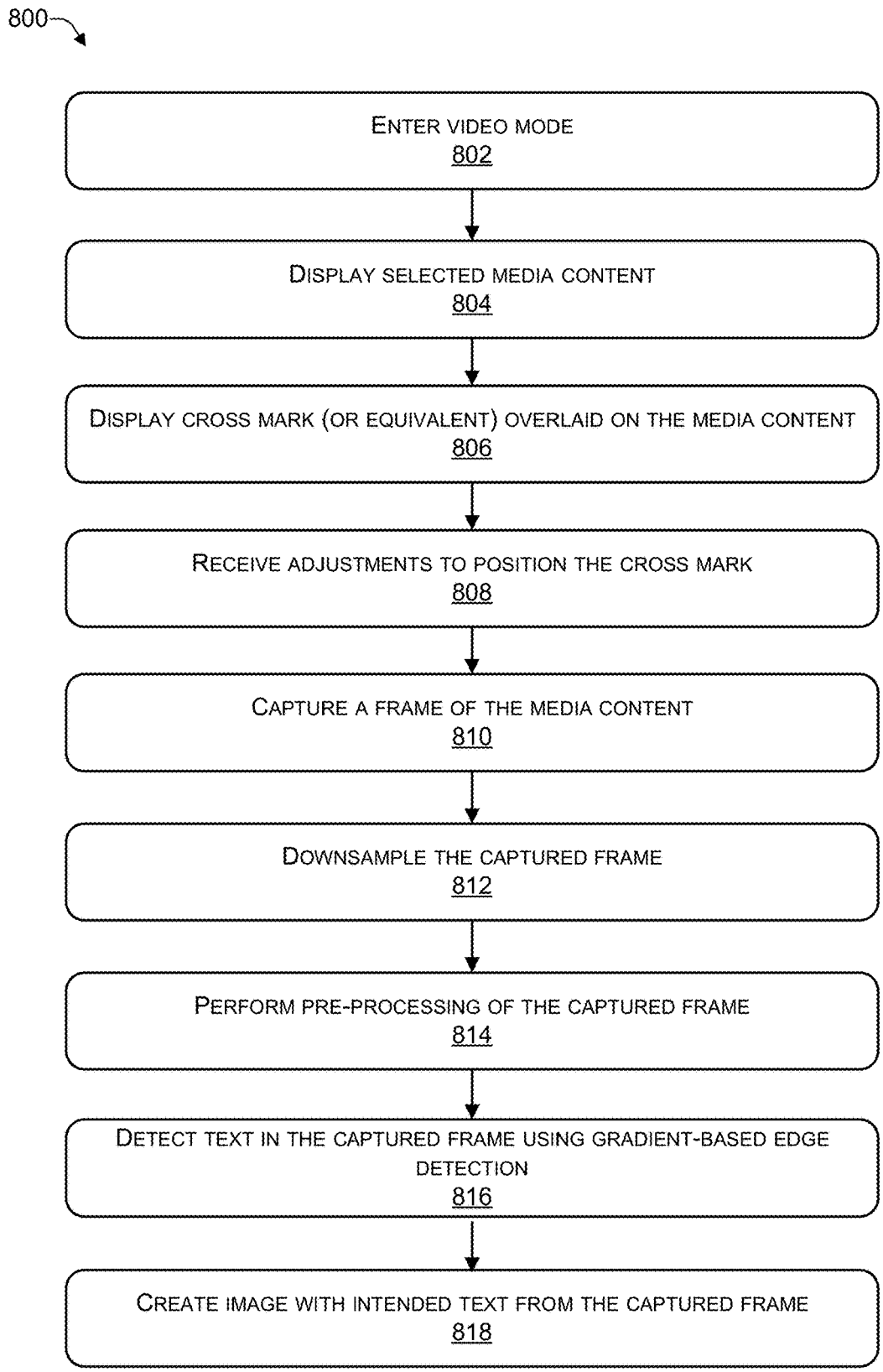
FIG. 8 is a flow diagram of an example process that includes creating an image with intended text according to some implementations.
Figure 9:
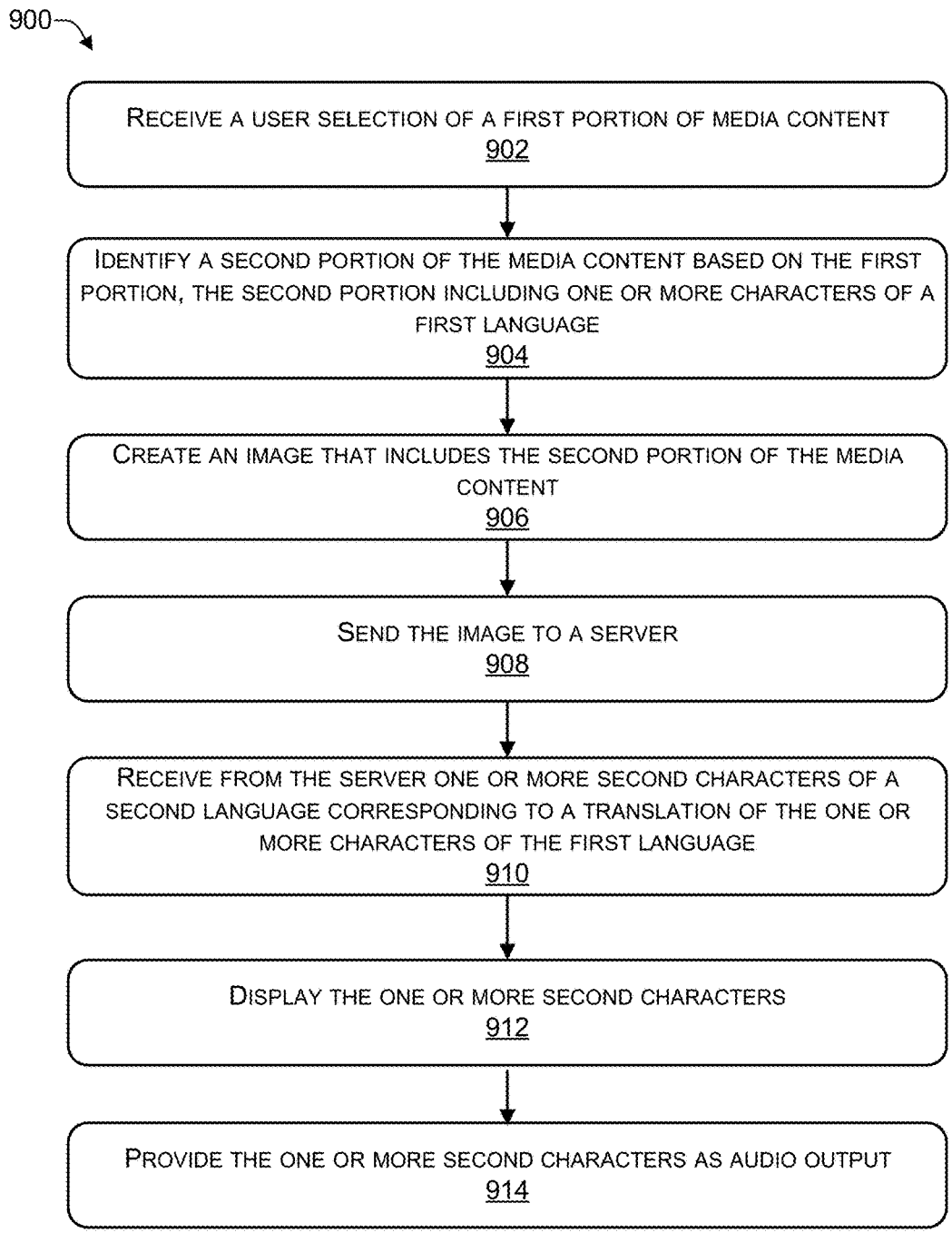
FIG. 9 is a flow diagram of an example process that includes translating language characters in media content according to some implementations.
Figure 10:
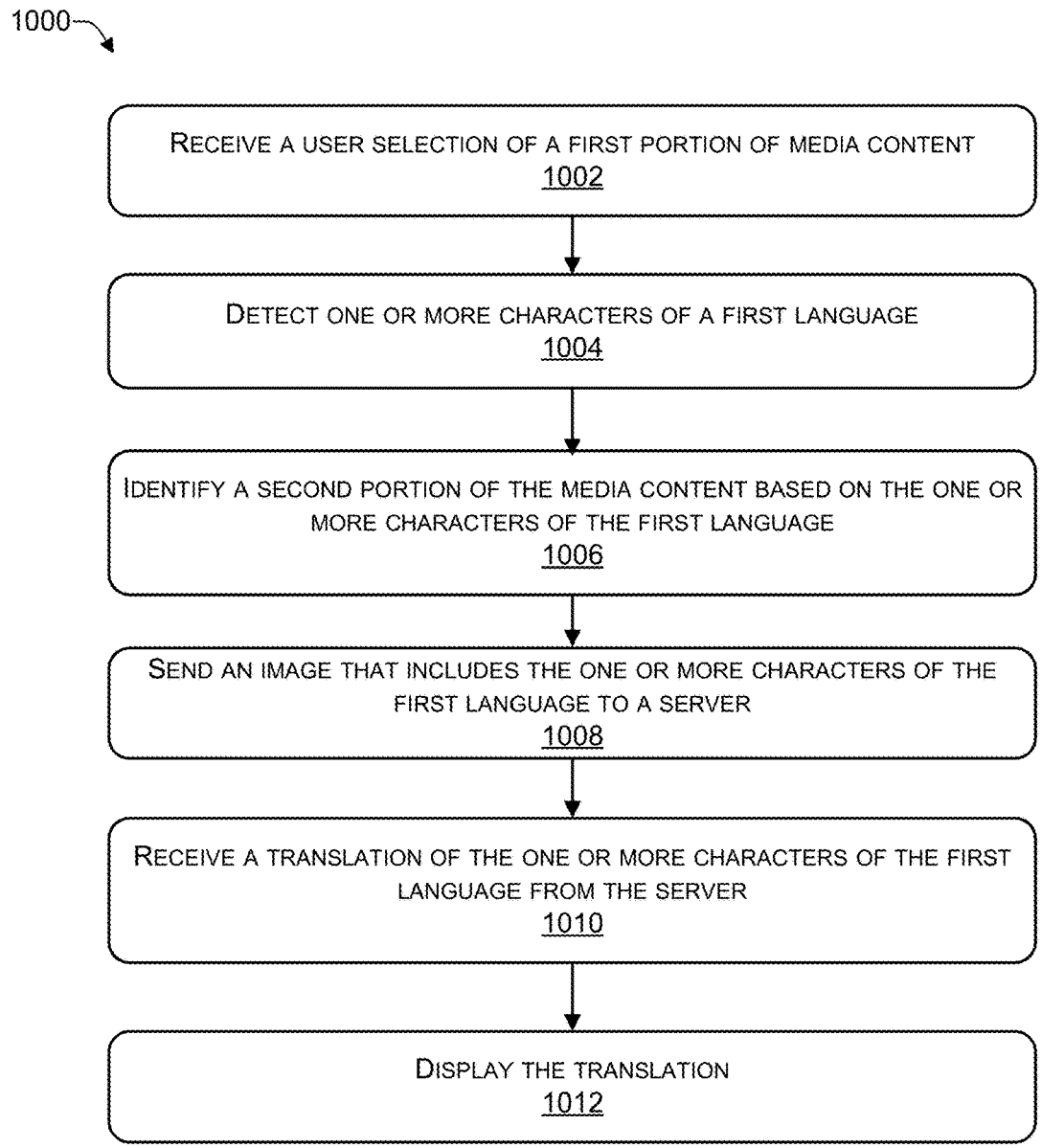
FIG. 10 is a flow diagram of another example process that includes translating language characters in media content according to some implementations.

FIG. 6 is a flow diagram of an example process 600 that includes creating an image with intended text according to some implementations. FIG. 7 is a flow diagram of an example process 700 of pre-processing media content according to some implementations. FIG. 8 is a flow diagram of an example process 800 that includes creating an image with intended text according to some implementations. FIG. 9 is a flow diagram of an example process 900 that includes translating language characters in media content according to some implementations. FIG. 10 is a flow diagram of an example process 1000 that includes translating language characters in media content according to some implementations. In the flow diagrams of FIGS. 7, 8, 9 and 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800, 900, and 1000 are described with reference to one or more of the frameworks 100, 200, 300, 400, and 500, described above, although other models, frameworks, systems and environments may implement these processes.

At block 602, a user device may enter a still image mode. For example, the user may interact with a user interface of the user device 102 to instruct the user device 102 to enter into the still image mode used to display or render still imagery (e.g., photographs, drawings, etc.). In some implementations, the still image mode may enable the user to provide the user selection via the tap gesture (e.g., the user selection 206), the swipe gesture (e.g., the user selection 302), or the circle gesture (e.g., the user selection 402).

At block 604, media content may be loaded. For example, the user device 102 may load the media content 110 in response to a user selection of the media content 110. The media content 110 may include one or more of an image (e.g., media content in a format such as RAW, JPEG, TIFF or the like) or a video (e.g., media content in an MPEG format or the like). The media content 110 may be created at the user device 102 via the camera 134 that is integrated into or coupled to the user device 102 or the media content 110 may be received from another device via the network 106. The media content 110 may be stored in and retrieved from a memory of the user device 102.

At block 606, the media content may be down-sampled to reduce the file size of the image (e.g., fewer bytes of data). For example, the user device 102 may down-sample the media content 110 to a resolution of approximately 640×480 pixels or other size. The down-sampling may be performed to improve an efficiency of the pre-processing at block 608.

At block 608, the media content may be pre-processed. For example, the user device 102 may pre-process the media content 110 based on the user selection 206. The pre-processing is described in more detail in FIG. 7.

At block 610, a user selection of a portion of the media content is received. For example, the user device 102 may receive the user selection selecting the first portion 204 of the media content 110.

At block 612, text in the media content may be detected based on the user selection. For example, the user device 102 may identify the second portion 208 (e.g., the intended text) of the media content 110 based on the first portion 204 of the media content 110.

At block 614, a determination may be made whether to adjust the user selection. For example, if the user is determined to be dissatisfied with the first portion 204 displayed in the callout window 202, the user may provide another user selection 206 at block 610. If the user is determined to be satisfied with the first portion 204 displayed in the callout window 202, the process may proceed to block 616.

At block 616, edge-based text detection may be performed. For example, the user device 102 may perform edge-based text detection to detect the second portion 208 (e.g., the intended text) based on the user selection 206 (e.g., the first portion 204). Edge-based text detection using the first portion 204 may be used to locate bounds of the second portion 208 (e.g., the intended text).

In edge-based text detection, user input, in the form of the user selection 206, may be represented by positions $p_l$ (left), $p_r$ (right), $p_t$ (top), and $p_b$ (bottom). For a tap gesture, $p_l=p_r$ while $p_t=p_b$, and for a swipe gesture $p_t=p_b$. The output of the edge-based text detection is the second portion 208 that includes the intended box. The second portion 208 may be described using the positions $bb_l$ (left), $bb_r$ (right), $bb_t$ (top), and $bb_b$ (bottom). The abbreviation bb refers to bounding box.

The term gr is used to represent a ratio of a minimum gap between words or characters to height. For example, for English and other Latin-based languages gr=0.2 may be used while for pictorial characters such as Chinese or Japanese, gr=0 may be used. The term L may be used to represent a fixed length of a horizontal line segment. In the example below, L=32 for illustration purposes. In some implementations, L may have a value different from 32. Initially, $bb_l=p_l$, $bb_b=p_b$, $bb_t=p_t$, and $bb_r=p_r$, e.g., the first portion 204 is used as the starting point for the second portion 208.

The top and bottom positions of the second portion 208 may be located by moving a horizontal line segment, with the length set as the max of $p_r-p_l$ and L, starting from the top point $((p_l+p_r)/2, p_t)$ or bottom point $((p_l+p_r)/2, p_b)$, vertically upwards (decrease $bb_t$) and downwards (increase $bb_b$), respectively, until a non-edge horizontal line segment is encountered, which contains no edge pixels of scanned connected components.

The left and right positions of the second portion 208 may be located by moving a vertical line segment, with the length set as the $bb_b-bb_t$ starting from the left point $(p_l, (bb_b+bb_t)/2)$ or right point $(p_r, (bb_b+bb_t)/2)$, horizontally leftwards (decrease $bb_l$) and rightwards (increase $bb_r$), respectively, until more than consecutive $(bb_b-bb_t)\cdot gr$ non-edge vertical line segments are collected.

In the case of a word with ascending or descending portions, $bb_t$ and $bb_b$ may be baseline positions rather than the desired border line positions. The top and bottom positions of the second portion 208 may be refined further by moving a horizontal line segment, with the length set to $bb_r-bb_l$, vertically upwards (decrease $bb_t$) and downwards (increase $bb_b$), respectively, until a non-edge horizontal line segment is encountered.

At block 618, an image may be created with the intended text from the media content based on the user selection. For example, the user device 102 may create the image 112 that includes the second portion 208 (e.g., the intended text) based on the user selection (e.g., the first portion 204). In some implementations, when the image is small (e.g., width or height is less than 40 pixels), the corresponding original image (e.g., before down-sampling) is sent to the server 104 instead of the down-sampled image.

FIG. 7 is a flow diagram of an example process 700 of pre-processing media content according to some implementations. For example, the media content may be preprocessed in a still-image mode to obtain an edge map for subsequent text detection.

At block 702, the image may be converted from a red-green-blue (RGB) image to a grayscale image. For example, the user device 102 may convert the image 112 from a color (e.g., RGB) image to a grayscale image.

At block 704, mean filter smoothing may be performed on the image. For example, the user device 102 may apply a 3×3 mean filter to the image 112 for image smoothing and noise removal.

At block 706, a Sobel operator may be used on the image. For example, the user device 102 may use a Sobel operator to calculate a gradient for each pixel. A gradient magnitude for each pixel may be approximated using a maximum of horizontal gradients and vertical gradients. An edge map may be initialized based on gradient features by using the non-maximum suppression to remove most non-edge pixels. The integral image of gradient features may be precalculated for performing global and local thresholding at block 708.

At block 708, global and local thresholding may be performed. The global thresholding may be performed by the user device 102 to remove non-edge pixels with very small gradient magnitude by using a conservative global threshold. For local thresholding, hysteresis thresholding may be used, in which two (e.g., a high and a low) local thresholds are calculated from the integral image. Consequently, both strong and weak edges can be preserved while non-edge pixels near an edge can be removed. After thresholding, a binary image morphology operation called bridge may be applied to make the edge map more connective.

At block 710, connected component analysis may be performed. Connected component analysis is an algorithmic application of graph theory, where subsets of connected components are uniquely labeled based on a given heuristic to detect connected regions in binary digital images.

At block 712, post-filtering may be performed. For example, the user device 102 may perform post-filtering to remove non-text connected components by using geometry information such as an area and aspect ratio of each connected component.

FIG. 8 is a flow diagram of an example process 800 that includes creating an image with intended text according to some implementations.

At block 802, a user device may enter a video mode. For example, the user may interact with a user interface of the user device 102 to instruct the user device 102 to enter into the video image mode used to display or render video imagery. In some implementations, the video image mode may enable the user to provide the user selection 502 by positioning a cross mark (e.g., the cross mark 504) or a bounding box to approximately overlay the first portion 204 of the media content 110.

At block 804, media content may be displayed. For example, the user device 102 may display the media content 110 on the touchscreen 108 in response to a user selection of the media content 110. The media content 110 may include one or more of an image (e.g., media content in a format such as RAW, JPEG, TIFF or the like) or a video (e.g., media content in an MPEG format or the like). The media content 110 may be created at the user device 102 via a camera that is integrated into or coupled to the user device 102 or the media content 110 may be received from another device via the network 106. The media content 110 may be stored in and retrieved from a memory of the user device 102.

At block 806, a cross mark (or equivalent) may be displayed as an overlay on the media content. For example, the cross mark 504, a bounding box, or other geometric shape (e.g., a circle, a square, a triangle etc.) may be displayed on the touchscreen 108 as an overlay on the media content 110.

At block 808, adjustments to position the cross mark may be received. For example, the user may position the cross mark 504 (or equivalent) using one or more tap gestures, one or more swipe gestures, via arrow keys of the user device 102, via a user interface displayed on the touchscreen 108, another type of input mechanism, or any combination thereof.

At block 810, a frame of the media content may be captured. For example, when the media content 110 is video content, the user may position the cross mark 504 and perform an action to indicate the user selection 502. To illustrate, the user may position the cross mark 504 and perform a tap gesture (or other user interface input) on the touchscreen to provide the user selection. In response, the user device 102 may capture a frame of the media content 110.

At block 812, the captured frame may be down-sampled. For example, the user device 102 may down-sample the captured frame to a resolution of approximately 640×480 pixels or another resolution, which may be of a smaller file size than an initial file size.

At block 814, the captured frame may be pre-processed. For example, the user device 102 may pre-process the captured frame of the media content 110 based on the user selection. The pre-processing is described in more detail above with reference to FIG. 7. In some implementations (e.g., for gradient-based text detection), one or more of the blocks 702, 704, or 706 of FIG. 7 may be performed.

At block 816, text in the captured frame may be detected using gradient-based text detection. For example, the user device 102 may perform gradient-based text detection to detect the second portion 208 (e.g., the intended text) based on the user selection 502 (e.g., the first portion 204). Gradient-based text detection may use the first portion 204 to locate bounds of the second portion 208 (e.g., the intended text).

In gradient-based text detection, the user may use a cross mark, bounding box or other graphical overlay to provide the user selection 502. The user selection 502 may be represented by positions $p_l$ (left), $p_r$ (right), $p_t$ (top), and $p_b$ (bottom). The output of the gradient-based text detection may be the second portion 208 that includes the intended box. The second portion 208 may be described using the positions $bb_l$ (left), $bb_r$ (right), $bb_t$ (top), and $bb_b$ (bottom). The abbreviation bb refers to bounding box.

The term gr is used to represent a ratio of a minimum gap between words or characters to height. For example, for English and other Latin-based languages gr=0.2 may be used while for pictorial characters such as Chinese or Japanese, gr=0 may be used. The term thr may be used to represent an adaptive threshold. The term L may be used to represent a fixed length of a horizontal line segment. In the example below, L=32 for illustration purposes. In some implementations, L may have a value different from 32. Initially, $bb_t=p_t$, $bb_b=p_b$, $bb_l=p_l$, and $bb_r=p_r$, e.g., the first portion 204 may be used as the starting point for the second portion 208.

The top and bottom positions of the second portion 208 may be located by moving a horizontal line segment, with the length set as the max of $p_r-p_l$ and L, starting from the top point $((p_l+p_r)/2, p_t)$ or bottom point $((p_l+p_r)/2, p_b)$, vertically upwards (decrease $bb_t$) and downwards (increase $bb_b$), respectively, until a maximum gradient magnitude on the current line segment is less than the adaptive threshold thr. The adaptive threshold thr may be related to the mean value of gradient magnitudes accumulated from scratch to the current horizontal line segment.

In some implementations, a more robust method to extract the top and bottom positions called convex hull technique may be used. In the convex hull technique, the difference of maximum and minimum gradient magnitude values on each horizontal line segment may be extracted as a feature. As the line segment moves upwards and downwards starting from an initial point, a feature profile can be formed incrementally. The top and bottom positions may correspond to the positions with the two steepest slopes of the feature profile. Given the feature profile, a convex hull may be constructed incrementally, from which the final top and bottom positions may be localized with an appropriate stopping criterion.

The left and right positions of the second portion 208 may be located by moving a vertical line segment, with the length set as the $bb_b-bb_t$, starting from the left point $(p_l, (bb_b+bb_t)/2)$ or right point $(p_r, (bb_b+bb_t)/2)$, horizontally leftwards (decrease $bb_l$) and rightwards (increase $bb_r$), respectively, until more than consecutive $(bb_b-bb_t)*gr$ vertical line segments, which satisfy that the maximum gradient magnitude of each vertical line segment is less than the adaptive threshold thr, are collected. The adaptive threshold thr may be related to the mean value of gradient magnitudes accumulated during the scanning using horizontal line segments.

In the case of a word with ascending or descending portions, $bb_t$ and $bb_b$ may be baseline positions rather than the desired border line positions. The top and bottom positions of the second portion 208 may be refined further by moving a horizontal line segment, with the length set to $bb_r-bb_l$, vertically upwards (decrease $bb_t$) and downwards (increase $bb_b$), respectively, until a horizontal line segment, which satisfies that the maximum gradient magnitude of horizontal line segment is less than the adaptive threshold thr, is encountered. The adaptive threshold thr is defined in [0098].

At block 818, an image may be created with the intended text from the captured frame. For example, the user device 102 may create the image 112 that includes the second portion 208 (e.g., the intended text) based on the user selection (e.g., the first portion 204).

FIG. 9 is a flow diagram of an example process 900 that includes translating language characters in media content according to some implementations.

At block 902, a user selection of a first portion of media content is received. For example, the user device 102 may receive the user selection 206 of the first portion 204 of the media content 110.

At block 904, a second portion of the media content is identified based on the first portion. The second portion may include one or more characters of a first language. For example, the user device 102 may identify the second portion 208 based on the first portion 204. The second portion 208 includes one or more characters in the first language 114. The user device 102 may identify the second portion 208 using edge-based text detection, gradient-based text detection, another type of text detection, or any combination thereof. The second portion 208 may be larger in size than the first portion 204.

At block 906, an image may be created that includes the second portion of the media content. For example, the user device 102 may create the image 112 from the media content 110. The image 112 may be smaller in size (e.g., have fewer bytes of data) than the media content 110.

At block 908, the image may be sent to a server. For example, the user device 102 may send the image 112 to the server 104 via the network 106.

At block 910, one or more second characters of a second language corresponding to a translation of the one or more characters of the first language may be received from the server.

At block 912, the one or more second characters may be displayed. For example, the user device 102 may receive one or more characters of the second language 120 from the server 104 and display the one or more second characters of the second language 120 on the touchscreen 108.

At block 914, the one or more characters may be provided as audio output. For example, the one or more second characters of the second language 120 may be provided as audio output in response to the user selecting the speech function 124. In some implementations, the one or more second characters of the second language 120 may be provided as audio output via text-to-speech function of the user device 102. In other implementations, the one or more second characters of the second language 120 may be provided as audio output by playing back an audio file received from the server 104 along with the translation 118. In some implementations, the user device 102 may receive the search results 132 from the server 104. The user device 102 may display the search results 132 on the touchscreen 108 automatically, based on a user profile stored at the user device 102, or in response to a user instruction.

FIG. 10 is a flow diagram of an example process 1000 that includes translating language characters in media content according to some implementations.

At block 1002, a user selection of a first portion of media content is received. For example, the user device 102 may receive the user selection 206 of the first portion 204 of the media content 110.

At block 1004, one or more characters of a first language are detected.

At block 1006, a second portion of the media content is identified based on the one or more characters of the first language. For example, the user device 102 may identify the second portion 208 based on the first portion 204. The second portion 208 includes one or more characters in the first language 114. The user device 102 may identify the second portion 208 using edge-based text detection, gradient-based text detection, another type of text detection, or any combination thereof. The second portion 208 may be larger in size (e.g., encompassing more characters, symbols, etc.) than the first portion 204.

At block 1008, an image that includes the second portion of the media content is sent to a server. For example, the user device 102 may create the image 112 from the media content 110 and send the image 112 to the server 104. The image 112 may be smaller in size (e.g., have fewer bytes of data) than the media content 110.

At block 1010, a translation of the one or more characters of the first language may be received from the server.

At block 1012, the translation may be displayed. For example, the user device 102 may receive the translation 118 corresponding to the characters of the first language 114 from the server 104 and display the translation 118 on the touchscreen 108. In some implementations, the user device 102 may receive the search results 132 from the server 104. The user device 102 may display the search results 132 on the touchscreen 108 automatically, based on a user profile stored at the user device 102, or in response to a user instruction.

Example Computing Device and Environment

Figure 11:
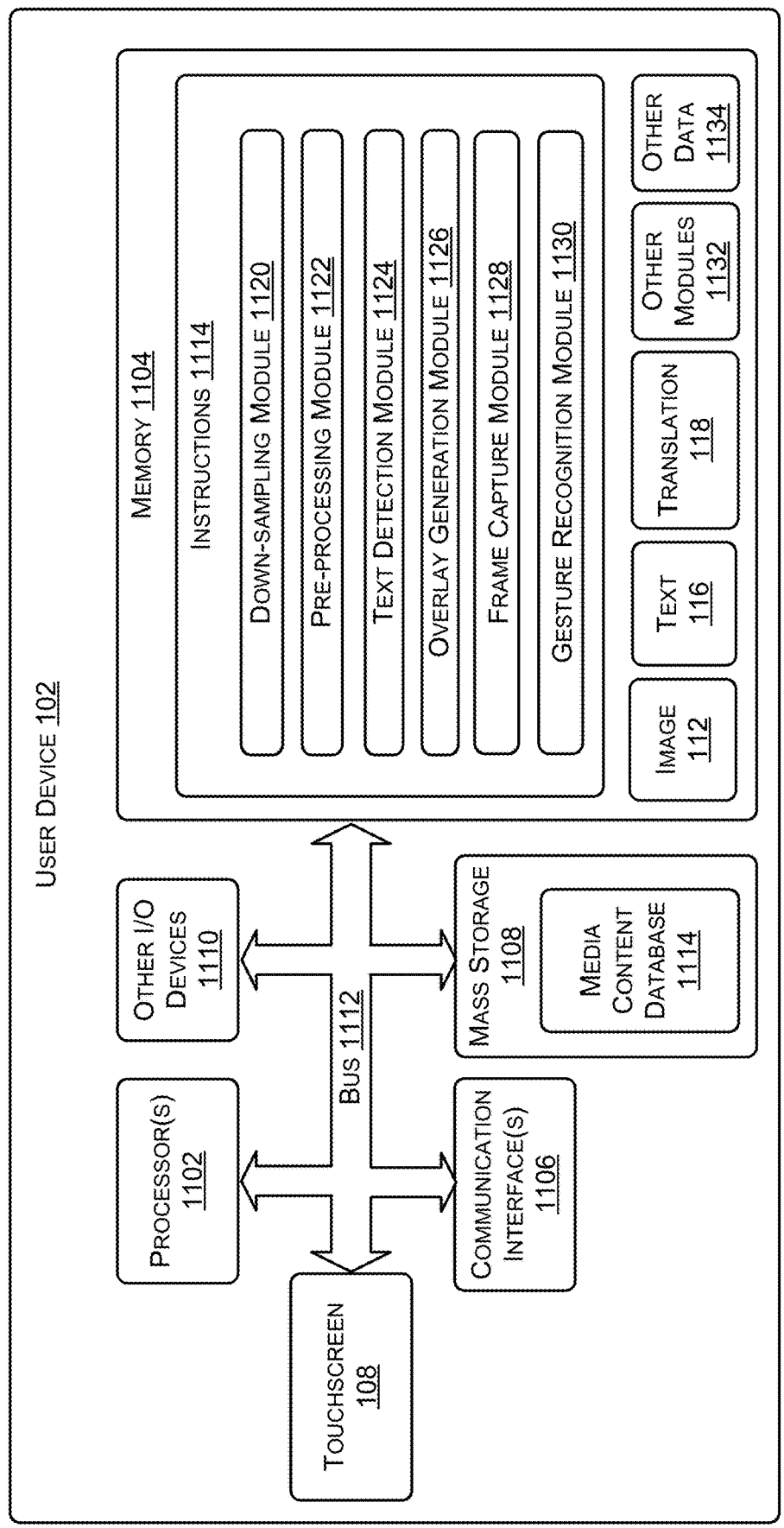
FIG. 11 is a block diagram of an example computing device and environment according to some implementations.

FIG. 11 illustrates an example configuration of the user device 102 and an environment that can be used to implement the modules and functions of the user device 102. The user device 102 may include at least one processor 1102, a memory 1104, communication interfaces 1106, a touchscreen 108, other input/output (I/O) devices 1110, and one or more mass storage devices 1108, able to communicate with each other, such as via a system bus 1112 or other suitable connection.

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions stored in the memory 1104, mass storage devices 1108, or other computer-readable media.

Memory 1104 and mass storage devices 1108 are examples of computer storage media for storing instructions which are executed by the processor 1102 to perform the various functions described above. For example, memory 1104 may generally include both volatile memory and non-volatile memory (e.g., RAM, ROM, or the like). Further, mass storage devices 1108 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices 1108 may be collectively referred to as memory or computer storage media herein, and may be capable of storing computer-readable, processor-executable program instructions as computer program code that can be executed by the processor 1102 as a particular machine configured for carrying out the operations and functions described in the implementations herein.

Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 1104, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 102. Any such computer storage media may be part of the computing device 102. Moreover, the computer-readable media may include computer-executable instructions that, when executed by the processor(s) 1102, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The user device 102 may also include one or more communication interfaces 1106 for exchanging data with other devices, such as via a network, direct connection, or the like, as discussed above. The communication interfaces 1106 can facilitate communications within a wide variety of networks and protocol types, including wired networks (e.g., LAN, cable, etc.) and wireless networks (e.g., WLAN, cellular, satellite, etc.), the Internet and the like. Communication interfaces 1106 can also provide communication with external storage (not shown), such as in a storage array, network attached storage, storage area network, or the like. The mass storage 1108 may include a media content database 1114 for storing media content, such as the media content 110.

A touchscreen 108 may be included in some implementations for displaying output and for receiving user input. For example, the touchscreen 108 may be used to display media content from the media content database 1114, as well as other items, such as the text 116, the translation 118, the search results 132, a user interface, and the like. The touchscreen 108 may also be capable of receiving user input via gestures, such as a tap gesture, a swipe gesture, or a circle gesture. Other I/O devices 1100 may be devices that receive various inputs from a user and provide various outputs to the user, and may include a keyboard, a remote controller, a mouse, a printer, audio input/output devices, and so forth.

Memory 1104 may include modules and components for performing functions related to translating image characters in media content according to the implementations herein. In the illustrated example, memory 1104 includes a down-sampling module 1120, a pre-processing module 1122, a text detection module 1124, an overlay generation module 1126, a frame capture module 1128, and a gesture recognition module 1130. The down-sampling 1120 may be configured to down-sample an image, such as the image 112. The pre-processing module 1122 may be configured to perform pre-processing, such as the pre-processing described in FIG. 7. The text detection module 1124 may be configured to detect text in an image using edge-based text detection, gradient-based text detection, another type of text detection, or any combination thereof. The frame capture module 1128 may be configured to capture a frame of a video. The gesture recognition module 1130 may be configured to recognize gesture input, such as a tap gesture, a swipe gesture, or a circle gesture. The gesture input may be received by the user interacting with the touchscreen 108 using an appendage, such as a finger, or using a stylus.

The memory 1104 may include other modules 1132 and other data 1134. The memory 1104 may include the image 112. The memory 1104 may also include the text 116 and the translation 118 received from the server 104.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 11 as being stored in memory 1104 of user device 102, the modules 1120, 1122, 1124, 1126, 1128, and 1130, or portions thereof, may be implemented using any form of computer-readable media that is accessible by the user device 102.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
   causing an image to be displayed that includes one or more words in a first language, wherein at least one word of the one or more words is displayed at a non-horizontal angle with respect to an edge of a screen displaying the image;
   receiving a swipe gesture to select a first portion of the image, wherein the swipe gesture selects one or more characters but not all characters of the one or more words in a continuous area of the image;
   identifying a second portion of the one or more words based on the first portion, the first and the second portions forming the one or more words in the image to be translated; and
   causing display of one or more translated words in a second language, the one or more translated words corresponding to a translation of the one or more words in the first language.

2. The method of claim 1, further comprising converting the one or more translated words to an audio output signal via a text to speech synthesizer.

3. The method of claim 1, further comprising causing search results to be displayed, the search results associated with performing a search based on at least one word of the one or more translated words in the second language.

4. The method of claim 1, further comprising causing search results to be displayed, the search results associated with performing a search based on the at least one word of the one or more words in the first language.

5. The method of claim 1, wherein the image comprises an image that is created based at least in part on down-sampling the one or more words.

6. The method of claim 1, further comprising causing a callout window to be displayed, wherein an enhanced version of the first portion of the one or more words is displayed in the callout window.

7. The method of claim 1, wherein identifying the second portion of the one or more words is based at least in part on a ratio of a minimum gap between words or characters in the first language to height of characters in the first language.

8. The method of claim 1, wherein the one or more translated words in the second language comprise a word-for-word translation corresponding to the one or more words.

9. The method of claim 1, wherein the image comprises one of:
a frame of a video; or
a still image.

10. An electronic device, comprising:
a touchscreen display;
a processor; and
a computer-readable storage device storing instructions executable by the processor to perform operations comprising:
causing to be displayed, at the touchscreen display, an image that includes one or more words in a first language, wherein at least one word of the one or more words is displayed at a non-horizontal angle with respect to an edge of the touchscreen display;
receiving a swipe gesture to select a first portion of the image, wherein the swipe gesture selects one or more characters but not all characters of the one or more words in a continuous area of the image;
causing a second portion of the one or more words to be identified based on the first portion, wherein the first and the second portions constitute the one or more words in the image to be translated; and
causing one or more translated words in a second language to be displayed, the one or more translated words corresponding to a translation of the one or more words in the first language.

11. The electronic device of claim 10, wherein the computer-readable storage device stores further instructions for:
receiving search results associated with performing a search based on at least one of:
the one or more words in the first language; or
the one or more translated words in the second language; and
causing the search results to be displayed.

12. The electronic device of claim 10, wherein the image comprises a still image.

13. The electronic device of claim 10, wherein the computer-readable storage device stores further instructions for down-sampling the second portion of the image prior to receiving the one or more translated words.

14. The electronic device of claim 10, wherein the computer-readable storage device stores further instructions for:
causing a bounding box to be display around the first portion;
receiving a corrective gesture; and
adjusting at least one of a height or a width of the bounding box based at least in part on the corrective gesture.

15. A method, comprising:
displaying an image that includes a phrase in a first language, the phrase comprising two or more words and at least one word in the phrase is displayed at a first non-horizontal angle with respect to an edge of a display screen;
receiving a swipe gesture selecting a first portion of the image that includes a part of at least one word in the phrase, wherein the first portion is one or more characters but not all characters of the phrase and is a continuous area in the image and the swipe gesture is performed at a second non-horizontal angle with respect to the edge of the display screen;
determining a second portion of the phrase based on the first portion, wherein the first and the second portions form the phrase in the image; and
displaying two or more translated words in a second language, the two or more translated words in the second language corresponding to the two or more words in the first language.

16. The method of claim 15, wherein the second non-horizontal angle substantially matches the first non-horizontal angle.

17. The method of claim 15, further comprising:
receiving search results associated with performing a search based on at least one of:
at least one word of the phrase in the first language; or
at least one word of the two or more translated words in the second language; and
displaying the search results.

18. The method of claim 15, further comprising displaying a callout window that includes the first portion of the image.

19. The method of claim 15, wherein the two or more translated words in the second language comprise a word-for-word translation corresponding to the two or more words in the first language.

20. The method of claim 15, wherein the two or more translated words comprise a phrase-based translation corresponding to the two or more words in the phrase.

* * * * *